(12) United States Patent
Lin et al.

(10) Patent No.: US 10,592,321 B2
(45) Date of Patent: Mar. 17, 2020

(54) DATA PROCESSING SYSTEM WITH LOGIC FUNCTIONAL SELF-CHECKING AND ASSOCIATED DATA PROCESSING METHOD

(71) Applicant: MEDIATEK INC., Hsin-Chu (TW)

(72) Inventors: Huei-Min Lin, Hsinchu (TW);
Yi-Chang Chen, Hsinchu (TW);
Chih-Ming Wang, Hsinchu (TW);
Yung-Chang Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 119 days.

(21) Appl. No.: 15/974,701

(22) Filed: May 9, 2018

(65) Prior Publication Data
US 2018/0329371 A1    Nov. 15, 2018

Related U.S. Application Data

(60) Provisional application No. 62/503,367, filed on May 9, 2017.

(51) Int. Cl.
| | |
|---|---|
| *G06F 11/00* | (2006.01) |
| *G05B 9/02* | (2006.01) |
| *G06F 1/08* | (2006.01) |
| *G06F 3/06* | (2006.01) |

(52) U.S. Cl.
CPC .............. *G06F 11/008* (2013.01); *G05B 9/02* (2013.01); *G06F 1/08* (2013.01); *G06F 3/0613* (2013.01); *G06F 3/0656* (2013.01); *G06F 3/0673* (2013.01); *G06F 2003/0691* (2013.01)

(58) Field of Classification Search
CPC ........ G06F 11/08; G06F 11/008; G06F 11/36; G06F 11/079; G06F 3/0613; G06F 3/0656; G06F 3/0619
See application file for complete search history.

(56) References Cited

U.S. PATENT DOCUMENTS 8,099,625 B1 * 1/2012 Tseng .................. G06F 11/2017 703/21
2018/0349259 A1 * 12/2018 Mariani ................ G06F 11/008

* cited by examiner

*Primary Examiner* — Shelly A Chase
(74) *Attorney, Agent, or Firm* — Winston Hsu

(57) ABSTRACT

A data processing system includes a buffer, a design under checking (DUC), and a self-checking circuit. The buffer is used to buffer data generated from a source device. The DUC is used to perform a designated function upon data read from the buffer when operating under a normal mode. The self-checking circuit is used to apply logic functional checking to the DUC when the DUC operates under a self-checking mode. When the DUC operates under the self-checking mode, the buffer keeps buffering data generated from the source device.

18 Claims, 5 Drawing Sheets

DATA PROCESSING SYSTEM WITH LOGIC FUNCTIONAL SELF-CHECKING AND ASSOCIATED DATA PROCESSING METHOD

CROSS REFERENCE TO RELATED APPLICATIONS

This application claims the benefit of U.S. provisional application No. 62/503,367, filed on May 9, 2017 and incorporated herein by reference.

BACKGROUND

The disclosed embodiments of the present invention relate to functional safety, and more particularly, to a data processing system with logic functional self-checking and an associated data processing method.

Functional safety includes the detection of malfunctions and taking proper actions before any harm is done, and is therefore a key issue for certain applications such as automotive electronic systems. For example, the system has to get itself into a safe state in time before a hazard occurs. Hence, it is necessary to apply a functional checking procedure to guarantee the correctness of a normal function during a normal system operation. However, the run time to achieve a complete diagnostic coverage required by the system may be long. In a case where a predetermined amount of the input data can be fully processed within a target timing budget, the quality of the functional safety may be influenced due to an incomplete diagnostic coverage achieved within the target timing budget. To achieve a complete diagnostic coverage required by the system, more time budgets are needed, thus affecting the performance of the system.

SUMMARY

In accordance with exemplary embodiments of the present invention, a data processing system with logic functional self-checking and an associated data processing method are proposed.

According to a first aspect of the present invention, an exemplary data processing system is disclosed. The exemplary data processing system includes a buffer, a design under checking (DUC), and a self-checking circuit. The buffer is arranged to buffer data generated from a source device. The DUC is arranged to perform a designated function upon data read from the buffer when operating under a normal mode. The self-checking circuit is arranged to apply logic functional checking to the DUC when the DUC operates under a self-checking mode. When the DUC operates under the self-checking mode, the buffer keeps buffering data generated from the source device.

According to a second aspect of the present invention, an exemplary data processing method is disclosed. The exemplary data processing method includes: performing, by a design under checking (DUC), a designated function upon data read from a buffer when the DUC operates under a normal mode; and when the DUC operates under a self-checking mode, applying logic functional checking to the DUC, and keeping buffering data generated from a source device in the buffer.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
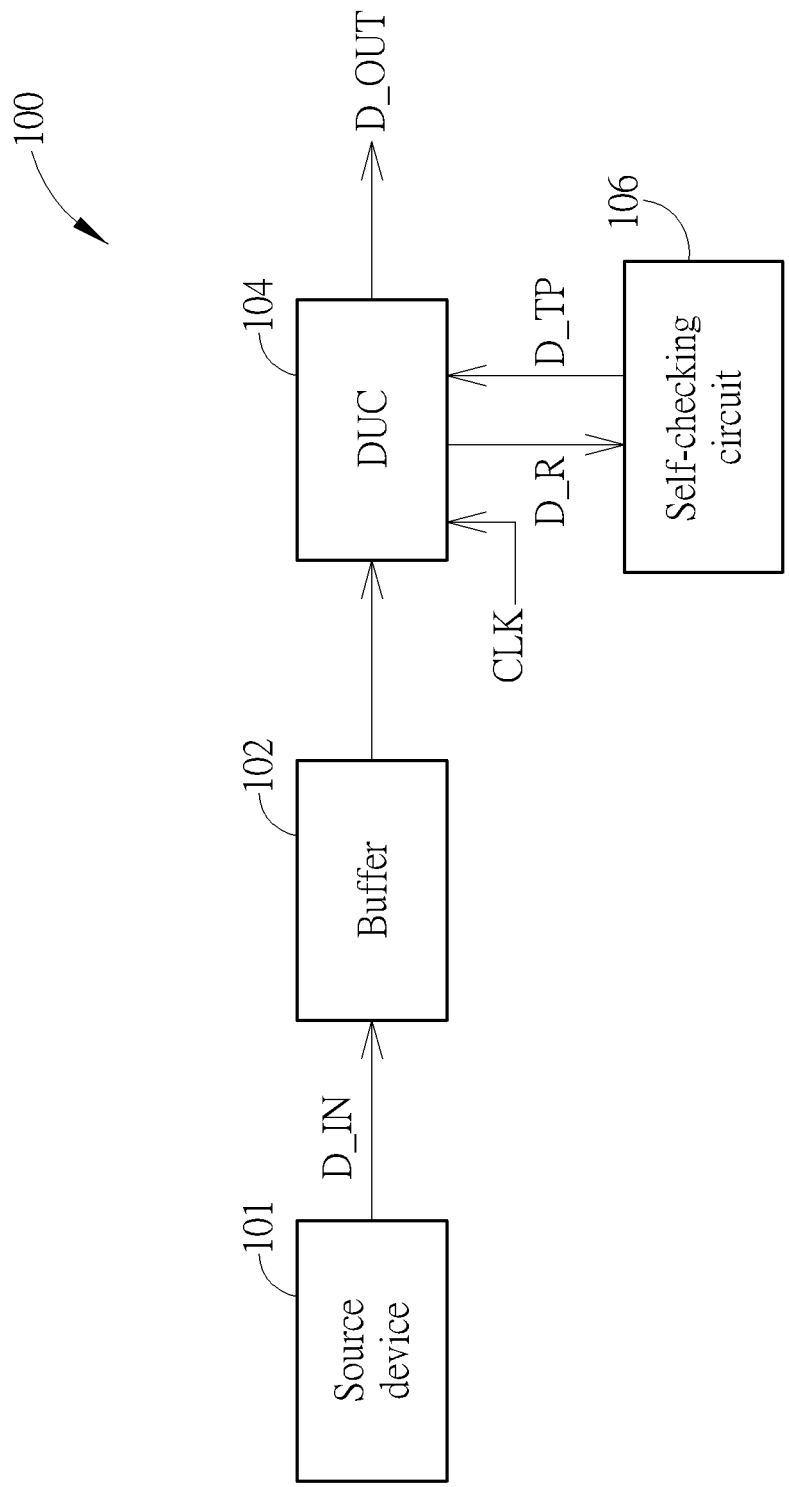
FIG. 1 is a diagram illustrating a data processing system with logic functional self-checking according to an embodiment of the present invention.

FIG. 1 is a diagram illustrating a data processing system with logic functional self-checking according to an embodiment of the present invention. By way of example, but not limitation, the data processing system 100 may be apart of an automotive electronic system. As shown in FIG. 1, the data processing system 100 may be a system on chip (SoC), and includes a source device 101, a buffer 102, a design under checking (DUC) 104, and a self-checking circuit 106. The source device 101 is a circuit arranged to provide bits of input data D_IN that are required to be processed by the DUC 104 operating under a normal mode. When operating under the normal mode, the DUC 104 is driven by a clock signal CLK, and is arranged to perform a designated function upon bits of the input data D_IN to generate bits of an output data D_OUT to a following stage (not shown).

The self-checking circuit 106 is arranged to apply logic functional checking to the DUC 104 when the DUC 104 operates under a self-checking mode. For example, the DUC 104 may be a processor, a sub-system, or any functional block which has the requirement of functional safety. Further, the logic functional checking applied to the DUC 104 may be logic built-in self testing (LBIST). That is, the self-checking circuit 106 may include an LBIST block responsible for applying LBIST to the DUC 104 under the self-checking mode. For example, the self-checking circuit 106 generates and outputs a test pattern D_TP to the DUC 104, and the DUC 104 outputs a response data D_R to the self-checking circuit 106 in response to the test pattern D_TP. Bits of the response data D_R can be used to verify the expected operation of the DUC 104.

It should be noted that the DUC 104 can operate in one of the normal mode and the self-checking mode at a time. That is, the DUC 104 leaves the normal mode and enters the self-checking mode at a first time point, such that the DUC 104 operates under the self-checking mode during a first period; and the DUC 104 leaves the self-checking mode and enters the normal mode at a second time point, such that the DUC 104 operates under the normal mode during a second period that does not overlap the first period. In this embodiment, the source device 101 may keep generating and outputting the input data D_IN while the DUC 104 is operating under the self-checking mode. Hence, the present invention proposes adding the buffer (e.g., a memory device) 102 between the source device 101 and the DUC 104. The buffer 102 is arranged to buffer data generated from the source device 102, and is further arranged to provide the stored data to the DUC 104 when requested by the DUC 104. When the DUC 104 operates under the self-checking mode, the buffer 102 keeps buffering bits of the input data D_IN generated from the source device 102. Hence, after the DUC 104 leaves the self-checking mode and enters the normal mode, the DUC 104 generates bits of the output data D_OUT by retrieving bits of the input data D_IN from the buffer 102 and then processing the retrieved bits of the input data D_IN. With the help of the buffer 102 coupled between the source device 101 and DUC 104, the execution timing of the logic functional checking (e.g., LBIST) is not limited to a short interval (e.g., a vertical blanking interval) in which the source device 101 does not output the input data D_IN (e.g., video frames).

When the DUC 104 operates under the self-checking mode, the DUC 104 may stop reading bits of the input data D_IN from the buffer 102. However, this is for illustrative purposes only, and is not meant to be a limitation of the present invention. That is, stopping the DUC 104 from reading bits of the input data D_IN from the buffer 102 under the self-checking mode may be optional, depending upon the actual design considerations.

Figure 2:
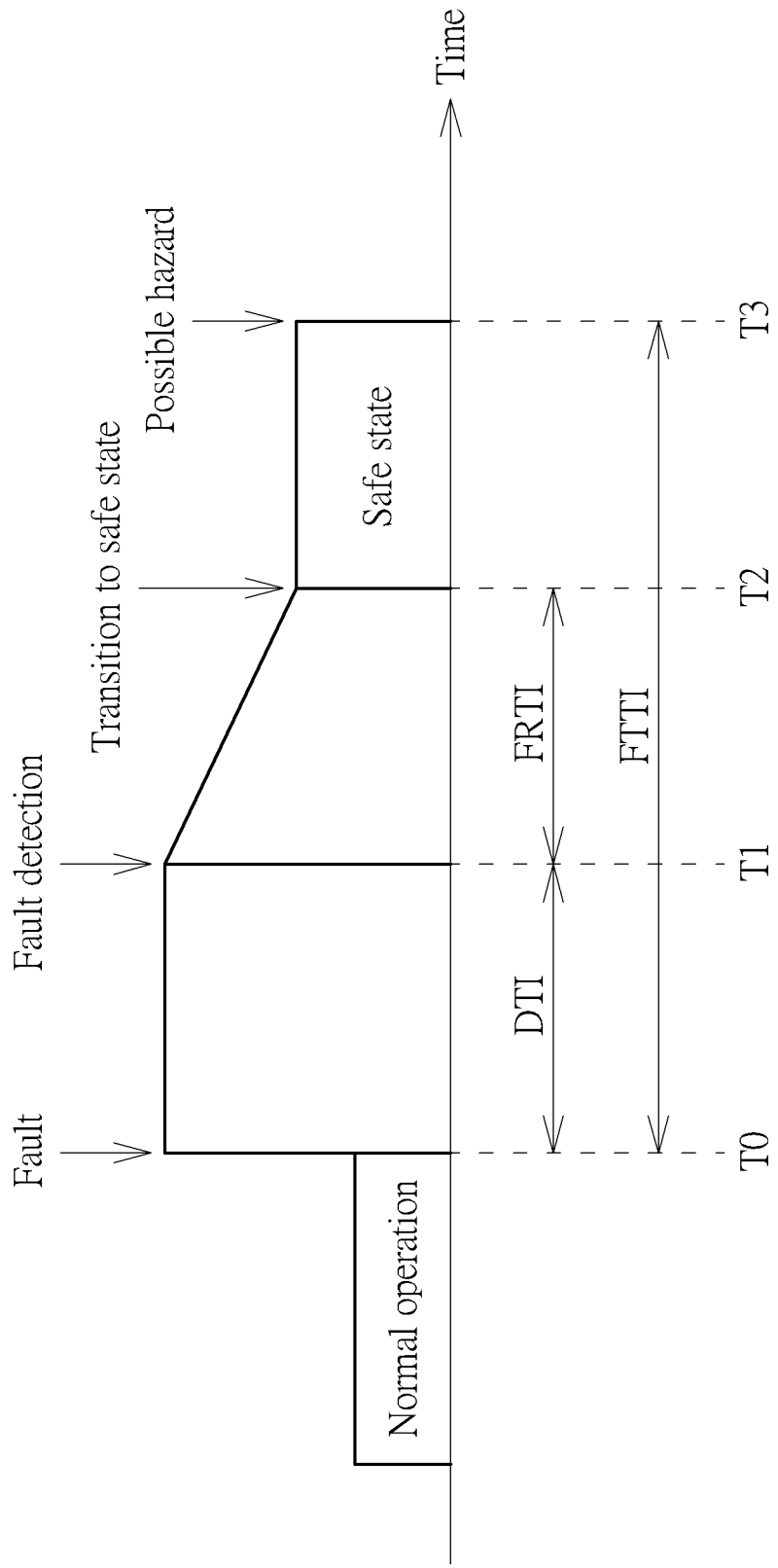
FIG. 2 is a diagram illustrating the principle of logic functional checking according to an embodiment of the present invention.

FIG. 2 is a diagram illustrating the principle of logic functional checking according to an embodiment of the present invention. In the beginning, a system performs a normal operation without faults. At time T0, a fault occurs. The fault is not detected until time T1. In this example, the fault may be detected by the logic functional checking enabled at a time point within a diagnostic test interval (DTI). Hence, the fault remains undetected during the DTI. The system must react on any safety critical failure. The most common approach is a transition to a safe state. As shown in FIG. 2, the system has the transition to the safe state during a fault reaction time interval (FRTI). At time T2, the system enters the safe state to avoid a possible hazard that may occur at time T3.

The FRTI is a time span from the detection of a fault to reaching the safe state, and is a part of a fault tolerant time interval (FTTI). The FTTI is a time span in which a fault or faults can be present in a system before a hazardous event occurs. Hence, if fault(s) cannot be successfully detected within one FFTI, the hazardous event resulting from the fault(s) will occur at the end of the FTTI. Since the occurrence of fault(s) is not predictable, the DUC 104 may undergo the self-test logic functional checking once every FTTI to thereby ensure the correctness of the normal operation during the safety lifecycle. In other words, a complete diagnostic coverage required by the DUC 104 should be periodically achieved for meeting the functional safety goal.

In this embodiment, one logic functional checking procedure for achieving one complete diagnostic coverage needed by the DUC 104 may be divided into a plurality of partial logic functional checking operations that are performed during a plurality of consecutive processing periods of the DUC 104, respectively, where each of the partial logic functional checking operations is used to achieve a portion of the complete diagnostic coverage. For example, one logic functional checking procedure for achieving a complete diagnostic coverage is divided into N partial logic functional checking operations, one complete diagnostic coverage is evenly divided into N diagnostic coverage portions, and the N diagnostic coverage portions are achieved by the N partial logic functional checking operations that are performed during N consecutive processing periods, respectively, where N is a positive integer larger than 1.

Figure 3:
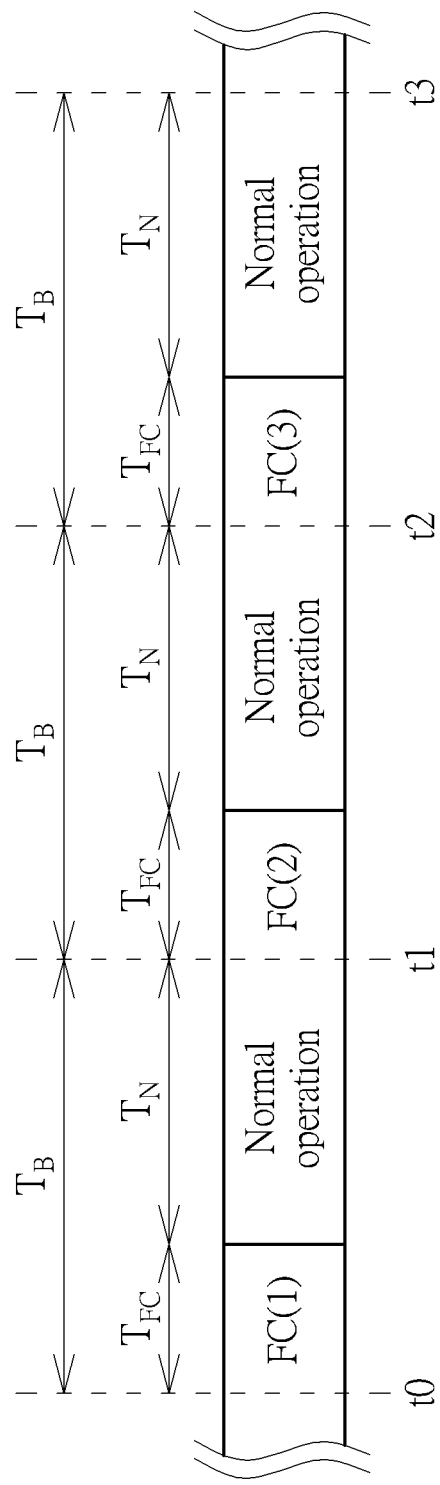
FIG. 3 is a timing diagram illustrating an operation of a DUC that operates under a self-checking mode and a normal mode alternately according to an embodiment of the present invention.

FIG. 3 is a timing diagram illustrating an operation of the DUC 104 that operates under a self-checking mode and a normal mode alternately according to an embodiment of the present invention. In this embodiment, one logic functional checking procedure for achieving one complete diagnostic coverage needed by the DUC 104 may be divided into three partial logic functional checking operations denoted by FC(1), FC(2), and FC(3). The DUC 104 has three consecutive processing periods $T_B$, each having a first interval $T_{FC}$ and a second interval $T_N$. Regarding each processing period $T_B$, the DUC 104 operates under the self-checking mode during the first interval $T_{FC}$, and operates under the normal mode during the second interval $T_N$. Further, a time span t0-t3 may be one FTTI (i.e., $3*T_B$).

During the first processing period $T_B$ shown in FIG. 3, the DUC 104 enters the self-checking mode at time t0, and leaves the self-checking mode and enters the normal mode at the end of the first interval $T_{FC}$. Hence, a first diagnostic coverage portion of one complete diagnostic coverage is achieved by the partial logic functional checking operation FC(1) at the end of the first interval $T_{FC}$. When the partial logic functional checking operation FC(1) is applied to the DUC 104, the buffer 103 keeps buffering data generated from the source device 101. Hence, after the DUC 104 enters the normal mode at the beginning of the second interval $T_N$, the DUC 104 processes the data read from the buffer 102 under the normal mode.

During the second processing period $T_B$ shown in FIG. 3, the DUC 104 leaves the normal mode and enters the self-checking mode at time t1, and leaves the self-checking mode and enters the normal mode at the end of the first interval $T_{FC}$. Hence, a second diagnostic coverage portion of one complete diagnostic coverage is achieved by the partial logic functional checking operation FC(2). When the partial logic functional checking operation FC(2) is applied to the DUC 104, the buffer 103 keeps buffering data generated from the source device 101. Hence, after the DUC 104 enters the normal mode at the beginning of the second interval $T_N$, the DUC 104 processes the data from the buffer 102 under the normal mode.

During the third processing period $T_B$ shown in FIG. 3, the DUC 104 leaves the normal mode and enters the self-checking mode at time t2, and leaves the self-checking mode and enters the normal mode at the end of the first interval $T_{FC}$. Hence, a third diagnostic coverage portion of one complete diagnostic coverage is achieved by the partial logic functional checking operation FC(3). When the partial logic functional checking operation FC(3) is applied to the DUC 104, the buffer 103 keeps buffering data generated from the source device 101. Hence, after the DUC 104 enters the normal mode at the beginning of the second interval $T_N$, the DUC 104 processes the data from the buffer 102 under the normal mode. After the third diagnostic coverage portion is achieved, one complete diagnostic coverage can be achieved by combining the first diagnostic coverage portion, the second diagnostic coverage portion, and the third diagnostic coverage portion. At time t3 (which is an end of the current FTTI and a start of the next FTTI), the next logic functional checking procedure begins.

As shown in FIG. 3, each processing period $T_B$ is divided into the first interval $T_{FC}$ and the second interval $T_N$. Hence, the second interval $T_N$ is only a portion of the processing period $T_B$. The DUC 104 is driven by the clock signal CLK when operating under the normal mode. In this embodiment, the clock signal CLK may be set by a higher clock frequency to ensure than the DUC 104 can still meet the throughput requirement of the design.

Figure 4:
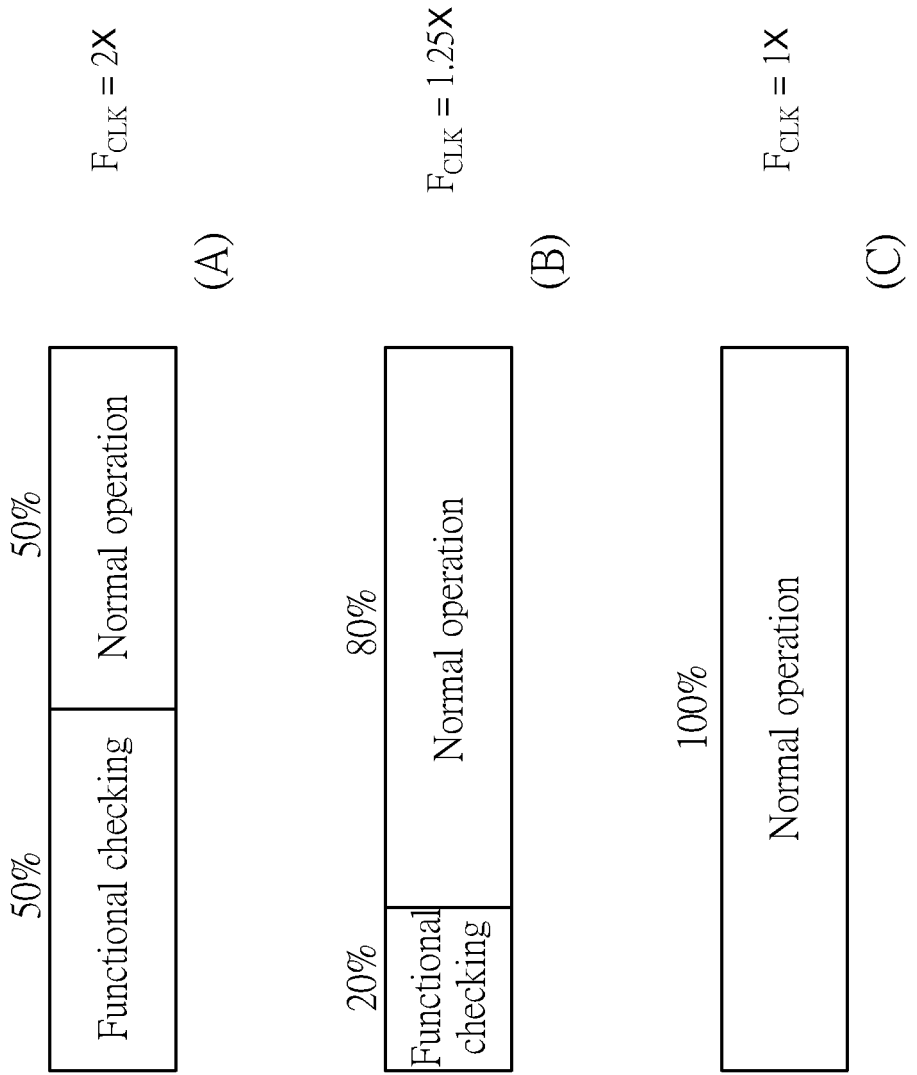
FIG. 4 is a diagram illustrating different settings of a clock frequency of a clock signal according to an embodiment of the present invention.

FIG. 4 is a diagram illustrating different settings of the clock frequency of the clock signal CLK according to an embodiment of the present invention. The sub-diagram (C) of FIG. 4 illustrates a case where there is no logic functional checking performed during a period with a length equal to a length of one processing period $T_B$ (which includes a first interval $T_{FC}$ for functional checking and a second interval $T_N$ for normal operation). For example, when the DUC 104 is implemented in a typical data processing system without logic functional self-checking, there is no logic functional checking applied to the DUC 104. The clock frequency $F_{CLK}$ of the clock signal CLK may be set by 1×, such that the DUC 104 driven by the clock signal CLK with $F_{CLK}$=1× and operating under the normal mode may have a throughput TP1 during a period with a length equal to a length of one processing period $T_B$.

In the proposed data processing system 100 with logic functional self-checking, the DUC 104 may enter the self-checking mode and the normal mode alternately. As shown in FIG. 3, the DUC 104 operates under the self-checking mode during a first interval $T_{FC}$ of a processing period $T_B$, and operates under the normal mode during a second interval $T_N$ of the same processing period $T_B$. The DUC 104 is driven by the clock signal CLK with a higher clock frequency $F_{CLK}$ (i.e., $F_{CLK}$>1×) to have a throughput TP2 during the second interval $T_N$. It should be noted that the higher clock frequency $F_{CLK}$ is properly set to ensure that the throughput TP2 is not smaller than the first throughput TP1. For example, the throughput TP2 is the same as the first throughput TP1. In this way, the throughput requirement of the design can still be met under a condition that the second interval $T_N$ is shorter than the processing period $T_B$.

The setting of the higher clock frequency $F_{CLK}$ is based at least partly on a ratio of the processing period $T_B$ to the second interval $T_N$. For example, the setting of the higher clock frequency $F_{CLK}$ is positively correlated with the ratio of the processing period $T_B$ to the second interval $T_N$. In one exemplary design, the higher clock frequency $F_{CLK}$ is set by a value that is equal to a product of a typical clock frequency (e.g., $F_{CLK}$=1× used in a typical system without logic functional self-checking) and the ratio of the processing period $T_B$ to the second interval $T_N$. The sub-diagram (A) of FIG. 4 illustrates a case where the ratio of the processing period $T_B$ to the second interval $T_N$ is 2

$$\left(\text{i.e., } \frac{T_B}{T_N} = \frac{50\% + 50\%}{50\%} = 2\right).$$

Hence, the clock frequency $F_{CLK}$ of the clock signal CLK used by the DUC 104 of the data processing system 100 with logic functional self-checking may be set by 2×. The sub-diagram (B) of FIG. 4 illustrates a case where the ratio of the processing period $T_B$ to the second interval $T_N$ is 1.25

$$\left(\text{i.e., } \frac{T_B}{T_N} = \frac{20\% + 80\%}{80\%} = 1.25\right).$$

Hence, the clock frequency $F_{CLK}$ of the clock signal CLK used by the DUC 104 of the data processing system 100 with logic functional self-checking may be set by 1.25×.

The proposed functional checking design employed by the data processing system 100 shown in FIG. 1 may also be applied to any system with the need of logic functional self-checking. In some embodiments of the present invention, the proposed functional checking design may be employed by an image signal processor (ISP) system. For example, the ISP system may be a part of an automotive electronic system.

Figure 5:
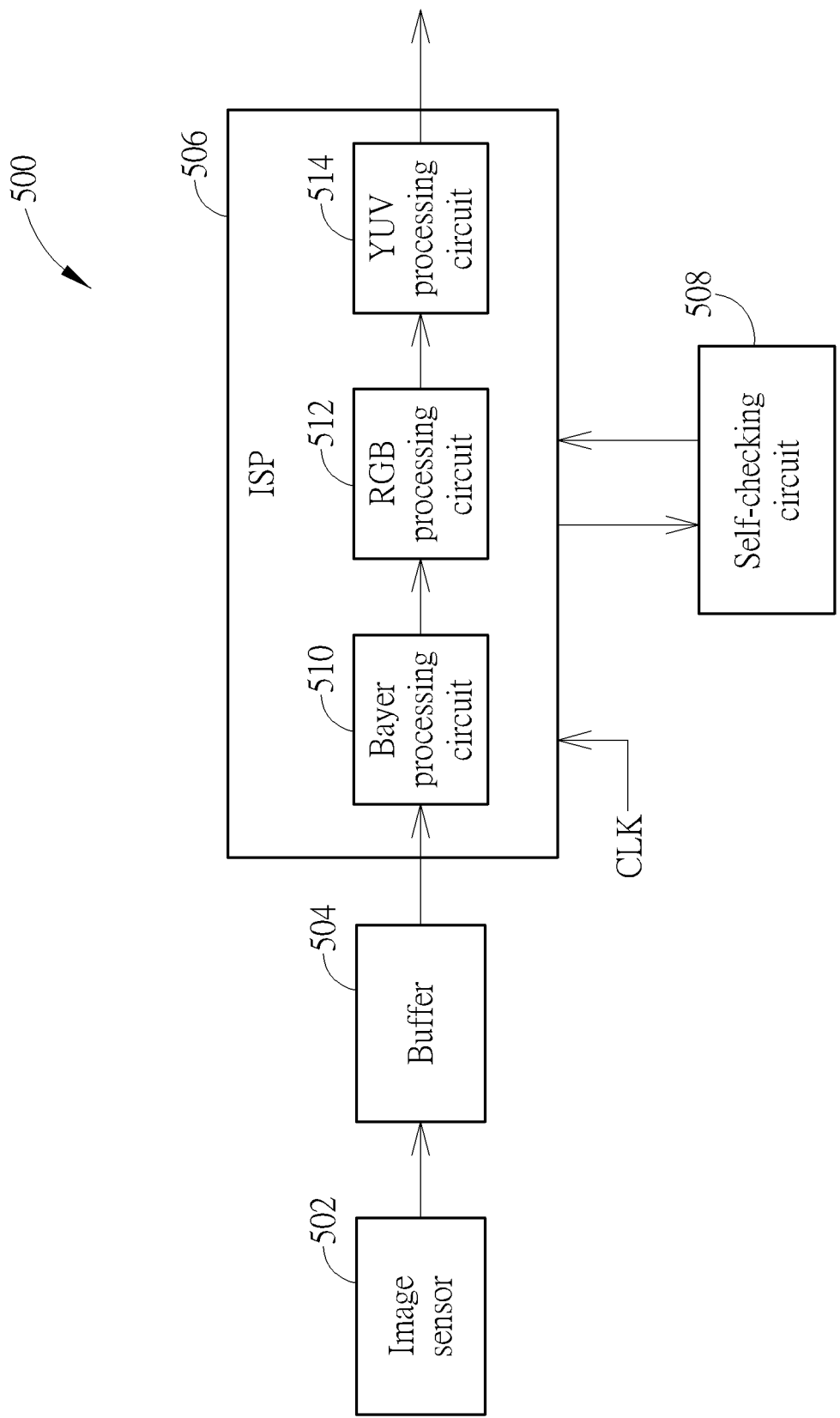
FIG. 5 is a diagram illustrating another data processing system with logic functional self-checking according to an embodiment of the present invention.

FIG. 5 is a diagram illustrating another data processing system with logic functional self-checking according to an embodiment of the present invention. For example, the data processing system 500 may be a part of an automotive electronic system. For another example, the data processing system 500 may be a system on chip (SoC). As shown in FIG. 5, the data processing system 500 is an ISP system, including an image sensor 502, a buffer 504, an ISP 506, and a self-checking circuit 508. The image sensor 502 may have a color filter array (CFA) such as a Bayer array. Regarding the ISP 506, it may include a plurality of image processing circuits, such as a Bayer processing circuit 510, an RGB processing circuit 512, and a YUV processing circuit 514. The Bayer processing circuit 510 is arranged to apply demosaicing to each video frame generated from the image sensor 502. Since the buffer (e.g., a memory device) 504 is coupled between the image sensor 502 and the ISP 506, the Bayer processing circuit 510 applies demosaicing to video frames read from the buffer 504. The RGB processing circuit 512 is arranged to process pixel values in the RGB color space. The YUV processing circuit 514 is arranged to process pixel values in the YUV color space.

The architecture of the data processing system 500 shown in FIG. 5 is based on that of the data processing system 100 shown in FIG. 1. Hence, the source device 101 shown in FIG. 1 may be implemented using the image sensor 502, the buffer 102 shown in FIG. 1 may be implemented using the buffer 504, the DUC 104 shown in FIG. 1 may be implemented using the ISP 506, and the self-checking circuit 106 shown in FIG. 1 may be implemented using the self-checking circuit 508.

Further, the data generated from the image sensor 502 may have a plurality of video frames. When operating under the self-checking mode, the ISP 506 may finish image processing of one video frame during the second interval $T_N$ of each processing period $T_B$ as shown in FIG. 3. Consider a case where one logic functional checking procedure for achieving a complete diagnostic coverage is divided into N partial logic functional checking operations, where N is a positive integer larger than 1. Hence, the self-checking circuit 508 can achieve one complete diagnostic coverage of the ISP 506 in every N consecutive processing periods of the ISP 506. In addition, the ISP 506 is driven by a clock signal CLK, and the clock signal CLK is set to have a higher clock frequency to meet the throughput requirement under a condition that the second interval $T_N$ is shorter than the processing period $T_B$. Since a person skilled in the art can readily understand details of the data processing system 500 after reading above paragraphs directed to the data processing system 100, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing system comprising:
   a buffer, arranged to buffer data generated from a source device;
   a design under checking (DUC), arranged to perform a designated function upon data read from the buffer when operating under a normal mode; and
   a self-checking circuit, arranged to apply logic functional checking to the DUC when the DUC operates under a self-checking mode;
   wherein when the DUC operates under the self-checking mode, the buffer keeps buffering data generated from the source device.

2. The data processing system of claim 1, wherein one processing period of the DUC comprises a first interval and a second interval; the DUC operates under the self-checking mode during the first interval; the DUC operates under the normal mode during the second interval; and the DUC is driven by a clock signal with a first clock frequency to have a first throughput during the second interval, where the DUC driven by a clock signal with a second clock frequency and operating under the normal mode during a period is capable of having a second throughput, a length of the period is equal to a length of the processing period, the first clock frequency is higher than the second clock frequency, and the first throughput is not smaller than the second throughput.

3. The data processing system of claim 2, wherein a setting of the first clock frequency is based at least partly on a ratio of the processing period to the second interval.

4. The data processing system of claim 3, wherein the setting of the first clock frequency is positively correlated with the ratio of the processing period to the second interval.

5. The data processing system of claim 3, wherein the first clock frequency is equal to a product of the second clock frequency and the ratio of the processing period to the second interval.

6. The data processing system of claim 1, wherein one processing period of the DUC comprises a first interval and a second interval; the DUC operates under the self-checking mode during the first interval; the DUC operates under the normal mode during the second interval; and the self-checking circuit achieves one complete diagnostic coverage of the DUC in every N consecutive processing periods of the DUC, where N is a positive integer larger than 1.

7. The data processing system of claim 6, wherein the data generated from the source device comprise a plurality of video frames; and the DUC finishes image processing of one video frame during the second interval of each of the N consecutive processing periods.

8. The data processing system of claim 1, wherein the DUC is an image signal processor (ISP) arranged to process video frames generated from the source device.

9. The data processing system of claim 1, wherein the data processing system is a part of an automotive electronic system.

10. A data processing method comprising:
    performing, by a design under checking (DUC), a designated function upon data read from a buffer when the DUC operates under a normal mode; and
    when the DUC operates under a self-checking mode:
       applying logic functional checking to the DUC; and
       keeping buffering data generated from a source device in the buffer.

11. The data processing method of claim 10, wherein one processing period of the DUC comprises a first interval and a second interval; the DUC operates under the self-checking mode during the first interval; the DUC operates under the normal mode during the second interval; and the data processing method further comprises:
    driving the DUC by a clock signal with a first clock frequency to make the DUC have a first throughput during the second interval, wherein the DUC driven by a clock signal with a second clock frequency and operating under the normal mode during a period is capable of having a second throughput, a length of the period is equal to a length of the processing period, the first clock frequency is higher than the second clock frequency, and the first throughput is not smaller than the second throughput.

12. The data processing method of claim 11, further comprising:
    setting the first clock frequency according to at least a ratio of the processing period to the second interval.

13. The data processing method of claim 12, wherein a setting of the first clock frequency is positively correlated with the ratio of the processing period to the second interval.

14. The data processing method of claim 12, wherein the first clock frequency is set by a value equal to a product of the second clock frequency and the ratio of the processing period to the second interval.

15. The data processing method of claim 10, wherein one processing period of the DUC comprises a first interval and a second interval; the DUC operates under the self-checking mode during the first interval; the DUC operates under the normal mode during the second interval; and the logic functional checking achieves one complete diagnostic coverage of the DUC in every N consecutive processing periods of the DUC, where N is a positive integer larger than 1.

16. The data processing method of claim 15, wherein the data generated from the source device comprise a plurality of video frames; and the DUC finishes image processing of one video frame during the second interval of each of the N consecutive processing periods.

17. The data processing method of claim 10, wherein the DUC is an image signal processor (ISP) arranged to process video frames generated from the source device.

18. The data processing method of claim 10, wherein the data processing method is employed by an automotive electronic system.

* * * * *